US008485257B2

(12) United States Patent
Bali et al.

(10) Patent No.: US 8,485,257 B2
(45) Date of Patent: Jul. 16, 2013

(54) SUPERCRITICAL PENTANE AS AN EXTRACTANT FOR OIL SHALE

(75) Inventors: Garima Singh Bali, Salt Lake City, UT (US); Sumit Bali, Salt Lake City, UT (US); Ronald J. Pugmire, Salt Lake City, UT (US); Edward M. Eyring, Salt Lake City, UT (US); Mark Dean Looney, Houston, TX (US)

(73) Assignees: Chevron U.S.A. Inc., San Ramon, CA (US); University of Utah Research Foundation, Salt Lake City, UT (US)

( * ) Notice: Subject to any disclaimer, the term of this patent is extended or adjusted under 35 U.S.C. 154(b) by 110 days.

(21) Appl. No.: 12/537,056

(22) Filed: Aug. 6, 2009

(65) Prior Publication Data

US 2010/0032171 A1 Feb. 11, 2010

Related U.S. Application Data

(60) Provisional application No. 61/086,717, filed on Aug. 6, 2008.

(51) Int. Cl.
*E21B 36/00* (2006.01)
(52) U.S. Cl.
USPC ........................................ 166/303
(58) Field of Classification Search
None
See application file for complete search history.

(56) References Cited

U.S. PATENT DOCUMENTS

| 3,630,281 | A | * | 12/1971 | Fast et al. | 166/290 |
|---|---|---|---|---|---|
| 3,771,598 | A | * | 11/1973 | McBean | 166/268 |
| 4,108,760 | A | | 8/1978 | Williams et al. | |
| 4,424,121 | A | | 1/1984 | Choi et al. | |
| 4,475,592 | A | * | 10/1984 | Pachovsky | 166/272.3 |
| 4,518,480 | A | | 5/1985 | Audeh et al. | |
| 4,521,293 | A | | 6/1985 | Scinta et al. | |
| 4,896,725 | A | * | 1/1990 | Parker et al. | 166/267 |
| 5,843,311 | A | * | 12/1998 | Richter et al. | 210/634 |
| 6,769,486 | B2 | * | 8/2004 | Lim et al. | 166/263 |
| 7,004,251 | B2 | * | 2/2006 | Ward et al. | 166/245 |
| 7,036,583 | B2 | * | 5/2006 | de Rouffignac et al. | 166/245 |
| 7,946,346 | B2 | * | 5/2011 | Zornes | 166/309 |
| 2008/0006410 | A1 | * | 1/2008 | Looney et al. | 166/308.4 |
| 2008/0277113 | A1 | * | 11/2008 | Stegemeier et al. | 166/272.1 |

FOREIGN PATENT DOCUMENTS

AU        B 21394/77        1/1977

OTHER PUBLICATIONS

El harfi, K., et al., "Supercritical fluid extraction of Moroccan (Timahdit) oil shale with water", *J. Analytical and Applied Pyrolysis* v. 50, pp. 163-174 (1999).

Kulik, M.D. and Neuworth, M.B., "Solvent Refining of Low Temperature Tar with Paraffinic Solvents", *Industrial and Engineering Chemistry* v. 52(2), pp. 141-144 (1960).

(Continued)

*Primary Examiner* — Shane Bomar
*Assistant Examiner* — Silvana Runyan
(74) *Attorney, Agent, or Firm* — Merchant & Gould

(57) ABSTRACT

Methods of extracting a hydrocarbon-based product from subsurface (oil) shale formations are provided. These methods rely on the use of an extraction fluid comprising pentane for facilitating the production of a mobile hydrocarbon-based product when the pentane contacts hydrocarbons in subsurface shale. The contacting process, and the subsequent process of recovering the mobile hydrocarbon-based product, is further enhanced by the methods of fracturing and/or rubblizing portions of the shale formation, so as to enhance their fluid permeability.

20 Claims, 5 Drawing Sheets

OTHER PUBLICATIONS

Luisa G-Hourcade, M., et al., "Study of solubility of kerogen from oil shales (Puertollano, Spain) in supercritical toluene and methanol", *Fuel* v. 86, pp. 698-705 (2007).

Tucker, J.D. et al., "A Comparison of Retorting and Supercritical Extraction Techniques on El-Lajjun Oil Shale", *Energy Sources* v. 22, pp. 453-463 (2000).

Subramanian, M. and Hanson, F.V., "Supercritical fluid extraction of bitumens from Utah oil sands", *Fuel Processing Technology* v. 55, pp. 35-53 (1998).

Vandenbroucke, M., "Kerogen: from Types to Models of Chemical Structure", *Oil & Gas Science and Technology* v. 58(2), pp. 243-269 (2003).

* cited by examiner

SUPERCRITICAL PENTANE AS AN EXTRACTANT FOR OIL SHALE

CROSS-REFERENCE TO RELATED APPLICATIONS

The present Application for Patent claims priority to U.S. Provisional Patent Application 61/086,717, filed Aug. 6, 2008, the contents of which are herein incorporated by reference in their entirety.

FIELD OF THE INVENTION

This invention relates to methods of extracting organic molecules from subterranean shale resources containing an organic kerogen component, particularly wherein such methods involve a step of increasing said kerogen component's accessibility to a fluid.

BACKGROUND

Oil shale is a sedimentary rock containing energy rich organic matter known as kerogen. Kerogen has a macromolecular structure, consisting of many large hydrocarbon chains with atoms of sulphur, nitrogen and oxygen. The processing of oil shale to recover the organic matter can be done by thermal retorting, pyrolysis and solvent extraction. Recent trends in processing of oil shale focus on more environmentally benign techniques.

This has led to the use of supercritical fluids as solvents for extraction of hydrocarbons from oil shale. Supercritical fluids exhibit properties that are intermediate between those of a gas and a liquid. The extraction using supercritical solvents is advantageous because of high densities, higher diffusion constants and lower viscosities than the corresponding liquids. These properties enable supercritical fluids to penetrate into matrices and to solubilize components which may be otherwise insoluble or only partially soluble in the solvents used. Several supercritical solvents such as methanol, toluene, carbon dioxide and water have been studied for extraction of kerogen from oil shale samples. Supercritical fluid extraction of bitumen from Utah oil sands has been studied with propane solvent by Subramanian et. al. However, there remains a need for solvents for the extraction of hydrocarbons from oil shale.

As disclosed herein, pentane at a temperature above the critical temperature of pentane, 197° C., and at a pressure above the critical pressure of pentane, 33.3 atmospheres, may be used for the extraction of hydrocarbons from oil shale.

SUMMARY OF THE INVENTION

The present invention is generally directed to methods of extracting a kerogen-based product from subsurface (oil) shale formations, wherein such methods rely on the use of supercritical paraffins for facilitating the production of a mobile kerogen-based product when the paraffins contact kerogen in subsurface shale. The contacting process, and the subsequent process of recovering the mobile kerogen-based product, can be further enhanced by methods of fracturing and/or rubblizing portions of the shale formation, so as to enhance their fluid permeability.

In some embodiments, the present invention is directed to methods for extracting a hydrocarbon-based product from a subsurface shale formation comprising: increasing accessibility of hydrocarbons in subsurface shale to a fluid, wherein the subsurface shale comprises an inorganic component in addition to the hydrocarbons; contacting the hydrocarbons in the subsurface shale with an extraction fluid comprising pentane at a temperature of greater than 197° C. and at a pressure of greater than 33.3 atmospheres to create a mobile hydrocarbon-based product; and transporting the mobile hydrocarbon-based product out of the subsurface shale formation to yield an extracted hydrocarbon-based product.

In some such embodiments, at least a portion of the pentane is present in the formation as a supercritical fluid.

In some such embodiments, the extracted hydrocarbon-based product is upgraded to yield one or more commercial petroleum-based products.

In some such embodiments, the extraction fluid further comprises a second component selected from the group consisting of carbon dioxide ($CO_2$), nitrogen ($N_2$), ammonia ($NH_3$), carbon monoxide (CO), argon (Ar), hydrogen ($H_2$), hydrogen sulfide ($H_2S$), air and combinations thereof.

In some such method embodiments, the step of increasing accessibility comprises the substeps of: providing for a cased injection well into the subsurface shale formation comprising the subsurface shale; pressurizing the injection well with a dense phase fluid to provide a pressurized well; and passing the dense phase fluid into the formation, and forming fractures within the formation.

In some such embodiments, the method further comprises comprising contacting the hydrocarbons in the subsurface shale with a reactive fluid to create a mobile hydrocarbon-based product.

In some embodiments, the hydrocarbon-based product that is recovered from the subsurface shale comprises greater than 50 wt % paraffins in the C10 to C25 range.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
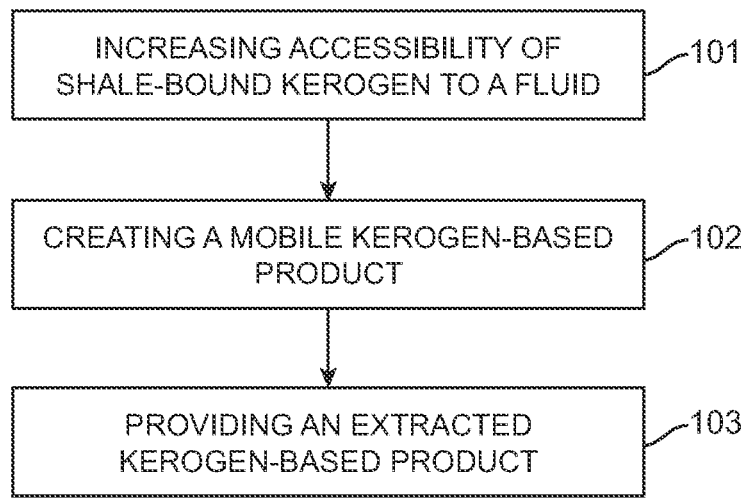
FIG. 1 depicts, in stepwise fashion, a general method of chemically modifying subsurface shale-bound kerogen so as to render it mobile and therefore extractable.

The present invention is directed to methods for extracting a hydrocarbon-based product from subsurface (oil) shale formations, wherein some such methods rely on fracturing and/or rubblizing portions of said formations so as to enhance their fluid permeability, and wherein some such methods further rely on mobilizing the shale-bound hydrocarbons. The present invention is also directed to systems for implementing some such methods.

Definitions

"Shale," as defined herein, generally refers to "oil shale" and is a general term applied to a group of rocks rich enough in organic material (called kerogen) to yield petroleum upon pyrolysis and distillation. Such shale is generally subsurface and comprises an inorganic (usually carbonate) component in addition to the kerogen component.

"Formation," as defined herein, generally refers to the mass of rock containing, and including, the organic material (called kerogen).

"Kerogen," as defined herein and as mentioned above, is an organic component of shale. On a molecular level, kerogen comprises very high molecular weight molecules that are generally insoluble by virtue of their high molecular weight and likely bonding to the inorganic component of the shale. The portion of kerogen that is soluble is known as "bitumen;" bitumen typically being the heaviest component of crude oil. In fact, in a geologic sense, kerogen is a precursor to crude oil. Kerogen is typically identified as being one of five types: Type I, Type II, Type II-sulfur, Type III, or Type IV, based on its C:H:O ratio and sulfur content, the various types generally being derived from different sources of ancient biological matter.

"Hydrocarbon" as used herein encompasses molecules comprising hydrogen and carbon. Additional atoms which may be present in the molecular hydrocarbon product include one or more of, for example, sulfur, nitrogen, oxygen, the halogens, phosphorous and metal atoms in organic complexation with the hydrocarbon molecule.

"Hydrocarbon-based," is a term used herein to denote a molecular product or intermediate derived from kerogen, such derivation requiring a chemical modification of the kerogen, and the term being exclusive of derivations carried out over geologic timescales.

An "extraction fluid" is characterized as having chemical and physical properties suitable for removing mobile phase hydrocarbons from a subsurface shale formation. Such removal processes may include converting hydrocarbons to a mobile phase which may be removed from a subsurface shale formation.

A "subsurface shale formation," as defined herein, is an underground geological formation comprising (oil) shale.

A "low-permeability hydrocarbon-bearing formation," as defined herein, refers to formations having a permeability of less than about 10 millidarcies, wherein said formations comprise hydrocarbonaceous material. Examples of such formations include, but are not limited to, diatomite, coal, tight shales, tight sandstones, tight carbonates, and the like.

A "dense phase fluid," as defined herein, is a non-gaseous fluid. Such dense phase fluids include liquids and supercritical fluids (SCFs).

A "supercritical fluid," as defined herein and as mentioned above, is any substance at a temperature and pressure above its thermodynamic critical point. Supercritical fluids can be regarded as "hybrid solvents" with properties between those of gases and liquids, i.e., a solvent with a low viscosity, high diffusion rates and no surface tension. The most common supercritical fluids are supercritical carbon dioxide ($CO_2$) and supercritical water.

The term "mechanical stress," as used herein, refers to structural stresses within the shale formation that result from pressure variations within the formation. Such stress can lead to fracturing and/or rubblization of the shale formation.

The term "thermal stress," as used herein, refers to structural stresses within the shale formation that result from thermal variations. Such thermal stresses can induce internal mechanical stresses as a result of differences in thermal coefficients of expansion among the various components of the shale formation. Like mechanical stress mentioned above, thermal stress can also lead to fracturing and/or rubblization of the shale formation.

The term "fracturing," as used herein, refers to the structural degradation of a subsurface shale formation as a result of applied thermal and/or mechanical stress. Such structural degradation generally enhances the permeability of the shale to fluids and increases the accessibility of the hydrocarbon component to such fluids. The term "rubblization," as used herein, is a more extensive fracturing process yielding fracture planes in multiple directions that generate shale-derived "rubble."

The term "cracking," as mentioned in the background section and as used herein, refers to the breaking of carbon-carbon bonds in the kerogen, or a molecular product or a derivative from kerogen, so as to yield species of lower molecular weight. "Retorting," provides thermal cracking of the kerogen. "Upgrading," provides cracking of the kerogen, but can involve a thermal or chemical upgrading agent. Accordingly, the term "thermal upgrading" is synonymous with the term "retorting."

The term "in situ," as used herein with regard to cracking or upgrading of kerogen, refers to such cracking or upgrading being carried out in the kerogen's native environment.

The term "commercial petroleum-based products," as used herein, refers to commercial products that include, but are not limited to, gasoline, aviation fuel, diesel, lubricants, petrochemicals, and the like. Such products could also include common chemical intermediates and/or blending feedstocks.

Referring to FIG. 1, in some embodiments, the present invention is generally directed to methods for extracting a hydrocarbon-based product from a subsurface shale formation comprising subsurface shale, the methods comprising the steps of: (Step 101) increasing accessibility of hydrocarbons in subsurface shale to a fluid (e.g., increasing the permeability of the shale), wherein the subsurface shale comprises an inorganic component in addition to the hydrocarbons; (Step 102) contacting the hydrocarbons in the subsurface shale with an extraction fluid comprising pentane at a temperature of greater than 197° C. and at a pressure of greater than 33.3 atmospheres to create a mobile hydrocarbon-based product; and (Step 103) transporting the mobile hydrocarbon-based product out of the subsurface shale formation to yield an extracted hydrocarbon-based product.

The above-mentioned step of increasing the accessibility of the subsurface shale to a fluid (Step 101) may include a variety of techniques and/or technologies such as, but not limited to, explosives, hydraulic fracturing, propellants, and the like. Generally, any method of fracturing and/or rubblizing regions of the shale formation, so as to render said shale more permeable to fluids, is suitable. Such fracturing and/or rubblizing can also involve chemicals reactive to, e.g., at least part of the inorganic shale component.

The step of contacting the hydrocarbons with an extraction fluid comprising pentane (Step 102) generally involves either the physical dissolution of the hydrocarbons into the extraction fluid, the removal of mobile molecular clusters from the hydrocarbons into the extraction fluid or an in situ chemical modification of the hydrocarbons (e.g., cracking) and/or surrounding shale so as to render the modified hydrocarbon component mobile (vide infra). Such chemical modification generally involves the making and/or breaking of chemical bonds.

The step of transporting the mobile hydrocarbon-based product out of the subsurface shale formation (Step 103) is not particularly limited, but can generally be described as a means of flowing the mobile hydrocarbon-based product out of the subsurface formation, where such a means can be active (e.g., pumping) and/or passive.

In some embodiments, the above-described method may involve one or more additional steps which serve to sample and subsequently analyze the shale prior to performing Step 101. Such sampling and analysis can have a direct bearing on the techniques employed in the subsequent steps.

In some embodiments, analysis and/or monitoring of the fracturing and/or rubblizing of the subsurface shale formation can be carried out during or after Step 101. Such analysis and/or monitoring can be performed using techniques known in the art for accomplishing such tasks.

In some embodiments, the extracted hydrocarbon-based product is upgraded (thermally and/or chemically) at the surface. Such surface upgrading can be intermediate to subsequent refining.

Increasing Fluid Accessibility to the Kerogen

Figure 2:
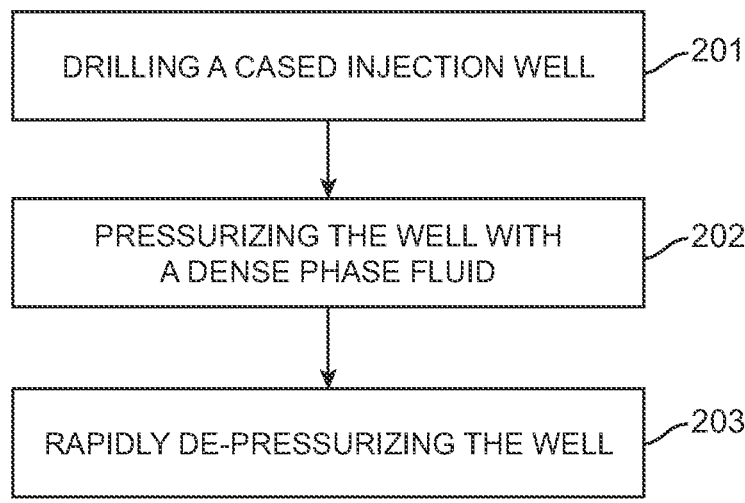
FIG. 2 depicts, in stepwise fashion, a method of increasing fluid accessibility to the kerogen, in accordance with some embodiments of the present invention.

Simultaneously referring to the above-described method and FIG. 2, in some embodiments, the step of increasing accessibility (Step 101) comprises the sub-steps of: (Sub-step 201) drilling a cased injection well into the subsurface shale formation comprising the subsurface shale; (Sub-step 202) pressurizing the injection well with a dense phase fluid to provide a pressurized well; and (Sub-step 203) passing the dense phase fluid into the formation, and forming fractures within the formation. In some such embodiments, the sub-steps of pressurizing and de-pressurizing are repeated until an equilibrium pressure is reached. In embodiments, the dense phase fluid passes through perforations in the casing of the injection well and into the formation.

The dense phase fluid can be any such fluid that suitably provides for increased accessibility of the hydrocarbons to a fluid—typically due to fracturing and/or rubblizing of the shale in which the hydrocarbons reside. In some embodiments, the dense phase fluid comprises a component selected from the group consisting of carbon dioxide (CO2), nitrogen (N2), liquid natural gas (LNG), ammonia (NH3), carbon monoxide (CO), argon (Ar), liquefied petroleum gas (LPG), hydrogen (H2), hydrogen sulfide (H2S), air, C1 to C20 hydrocarbons (including, but not limited to, ethane, propane, butane, pentane and combinations thereof), and the like. In some embodiments, the dense phase fluid comprises pentane.

In some embodiments, an aqueous solution, optionally containing a thickener, is injected from the wellbore into the reservoir to place or extend highly conductive fractures within the reservoir. During fracturing, hydraulic fracturing fluid is injected through the wellbore into a subterranean formation at high rates and pressures. The fracturing fluid injection rate exceeds the filtration rate into the formation, producing increasing hydraulic pressure at the formation face. When the pressure exceeds a critical value, the formation strata or rock cracks and fractures. The formation fracture is more permeable than the formation porosity. In some embodiments, it may be desirable to use proppants to prevent fractures from closing after the hydraulic fracturing step. The resulting propped fracture enables improved flow of the recoverable fluid, i.e., oil, gas or water. Sand, gravel, glass beads, walnut shells, ceramic particles, sintered bauxites and other materials may be used as a proppant.

Exemplary hydraulic fracturing fluids are aqueous solutions containing a thickener, such as a solvatable polysaccharide, to provide sufficient viscosity to transport the proppant. Typical thickeners are polymers, such as guar (phytogeneous polysaccharide), and guar derivatives (hydroxypropyl guar, carboxymethylhydroxypropyl guar). Other polymers can be used also as thickeners. Water with guar represents a linear gel with a viscosity proportional to the polymer concentration. Cross-linking agents are used which provide engagement between polymer chains to form sufficiently strong couplings that increase the gel viscosity and create viscoelasticity. Common crosslinking agents for guar include boron, titanium, zirconium, and aluminum.

Such methods for using hydraulic fracturing are taught, for example, in US20090044945, the disclosure of which is incorporated herein by reference for all purposes.

In some embodiments, the dense phase fluid is absorbed by the kerogen and the kerogen subsequently swells, and wherein the swollen kerogen expands the subsurface shale formation and creates mechanical stresses leading to subsequent fracturing and/or rubblization of said formation. In some such embodiments, the mechanical stresses created during the pressurizing and depressurizing sub-steps enhance fracturing and/or rubblization of the subsurface shale formation.

In some embodiments, the pressurizing and depressurizing sub-steps create thermal and/or mechanical stresses in the subsurface shale formation. In some such embodiments, the kerogen at least partially delaminates from the inorganic component of the shale as a result of the thermal stresses.

In some embodiments, explosives are added to the dense phase fluid to enhance rubblization and fracturing of the formation. Examples of such explosives include, but are not limited to, strongly oxidizing species, nitro-containing species (e.g., trinitrotoluene, nitroglycerine), thermite mixtures, and the like. The dense phase fluids to which such explosives can be added include, but are not limited to, carbon dioxide (CO2), nitrogen (N2), liquid natural gas (LNG), ammonia (NH3), carbon monoxide (CO), argon (Ar), liquefied petroleum gas (LPG), hydrogen (H2), hydrogen sulfide (H2S), air, C1 to C20 hydrocarbons (including, but not limited to, ethane, propane, butane, pentane and combinations thereof), and the like.

Extracting the Mobile Hydrocarbon Product

In embodiments, the method for extracting a hydrocarbon product from a subsurface shale formation comprises contacting the hydrocarbons in the subsurface shale with an extraction fluid comprising pentane at a temperature of greater than 197° C. and at a pressure of greater than 33.3 atmospheres to create a mobile hydrocarbon-based product.

Thus, an extraction fluid comprising pentane is supplied to the shale formation for converting the hydrocarbons to a mobile phase at a temperature of greater than 197° C. and at a pressure of greater than 33.3 atmospheres, wherein such conversion is either a chemical conversion characterized by chemical bond breaking, or a physical conversion characterized by dissolution of a portion of the hydrocarbons, or removal of mobile molecular clusters from the hydrocarbons. In embodiments, at least a portion of the pentane is supplied to the shale formation at a temperature of greater than 225° C. or at a temperature within the range from 250° C. to 400° C., or at a temperature within the range from 250° C. to 350° C. In embodiments, the at least a portion of the pentane is supplied to the shale formation at a pressure of greater than 35 atmospheres or at a pressure in the range of 35 to 50 atmospheres. In some such embodiments, the hydrocarbons are converted to a mobile phase at a temperature within the range from 250° C. to 350° C. and at a pressure in the range of 35 to 50 atmospheres.

An extraction fluid is characterized as having chemical and physical properties suitable for mobilizing hydrocarbons in the subsurface shale formation and for removing, at least in part, the mobile phase from a subsurface shale formation. Such removal processes may include converting hydrocarbons to a mobile phase which may be removed from a subsurface shale formation. In embodiments, the extraction fluid comprises hydrocarbons or organic derivatives of hydrocarbons having a critical temperature above 150° C. In some such embodiments, the critical temperature of the hydrocarbons or organic derivates thereof is below 450° C. Aliphatic hydrocarbons having at least five carbon atoms are effective components of the extraction fluid, e.g. $C_5$-$C_{16}$ aliphatic hydrocarbons. In embodiments normal paraffins are selected for their combination of high solvency capability, as well as low reactivity. Alkenes, by contrast, may become at least partially hydrogenated, particularly with any hydrogen which may be present, or otherwise subject to polymerization under the conditions of extraction. Branched hydrocarbons having long branched chains are more likely to be subjected to molecular rearrangement and cross alkylation reactions under the conditions of extraction.

In some embodiments, the extraction fluid further comprises a second component selected from the group consisting of carbon dioxide ($CO_2$), nitrogen ($N_2$), ammonia ($NH_3$), carbon monoxide (CO), argon (Ar), hydrogen ($H_2$), hydrogen sulfide ($H_2S$), air and combinations thereof. In some such embodiments, at least a portion of the second component is carbon dioxide at a pressure above the critical pressure of carbon dioxide ($CO_2$), and at a temperature above the critical temperature of carbon dioxide ($CO_2$).

In some embodiments, the step of providing an extraction fluid comprising pentane to the formation comprises the substeps of drilling a cased injection well into the subsurface shale formation comprising the subsurface shale, pressurizing the injection well with the extraction fluid, and passing the extraction fluid into the formation such that at least a portion of the extraction fluid in the formation is at a temperature of greater than 197° C. and a total pressure of greater than 33.3 atmospheres. In embodiments, at least a portion of the total pressure is supplied by a second extraction fluid (in addition to pentane), such as carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, $C_1$ to $C_{20}$ hydrocarbons (including, but not limited to, ethane, propane, butane, and combinations thereof), and the like. The fluids injected into the injection well will be in the ratio range of from 100% by weight of pentane, to a weight ratio of pentane to the second extraction fluid of 10:90.

Heat needed to increase the temperature of the extraction pentane may be supplied from an external source within the well; it may be supplied with the pentane which is supplied to the well; it may be supplied from the well itself, or the formation surrounding the well; it may be supplied by the second extraction fluid, or combinations thereof.

In some embodiments, therefore, extraction fluid is supplied to the injection well at conditions sufficient to maintain at least a portion of the pentane within the formation at temperatures of greater than 197° C. and at total pressures of greater than 33.3 atmospheres. The extraction fluid is forced through, for example, perforations in the well casing and into the formation. In embodiments, the extraction process is a continuous system, with pentane, alone or in combination with the second extraction fluid, being circulated into an injection well, through the formation at a temperature of greater than 197° C. and at a pressure of greater than 33.3 atmospheres, and removed continuously from a recovery well for processing to remove the shale oil contained therein. In other embodiments, the extraction fluid is supplied to the injection well and into the formation at conditions sufficient to maintain at least a portion of the pentane within the formation at temperatures of greater than 197° C. and at pressures of greater than 33.3 atmospheres for a soaking time sufficient to extract organic matter from the shale. Exemplary soaking times are generally greater than 3 hours, such as within a range of 3 hours to 30 days or within a range of 5 hours to 7 days. At the end of the soaking period, the pressure is reduced to a condition that permits flow of the pentane back into the injection well for removal and treating.

Creating a Mobile Kerogen-Based Product

In embodiments, the method of extracting a hydrocarbon product from a subsurface shale formation further comprises contacting the hydrocarbons in the subsurface shale with a reactive fluid to create a mobile hydrocarbon-based product. In some such embodiments, the step of contacting the hydrocarbons in the subsurface shale with a reactive fluid involves a chemical modification of the hydrocarbons. In some such embodiments, the chemical modification involves at least some cracking of the hydrocarbons. In some such embodiments, the reactive fluid comprises a component selected from the group consisting of organic acids, inorganic acids, peroxides, free radical producing chemicals, Lewis acids, humic depolymerization agents, olefin metathesis catalysts, microbes, catalysts, and combinations thereof.

In some embodiments, the step of contacting the hydrocarbon in the subsurface shale with a reactive fluid to create a mobile hydrocarbon-based product involves a physical dissolution process, with the reactive fluid dissolving a portion of the hydrocarbons or removing mobile molecular clusters from the hydrocarbon. In some embodiments, the step of contacting the hydrocarbon in the subsurface shale with a reactive fluid to create a mobile hydrocarbon—based product involves a chemical modification of the hydrocarbon. In some such embodiments, the chemical modification involves at least some cracking of the hydrocarbon, generating smaller hydrocarbon-derived molecules that are correspondingly more mobile. In embodiments, an extraction fluid comprising pentane is supplied following the reactive fluid to recover the hydrocarbon-based from the subsurface shale formation.

In some embodiments, depending on the conditions and reactive fluids employed and on the kerogen bonds that are broken, it is possible to generate a mobile hydrocarbon-based product that is tailored so as to minimize recovery of heavy metals and/or other undesirable materials, or to increase recovery by reducing char and/or other carbon residues. Accordingly, it is possible to generate a mobile hydrocarbon-based product that requires little or no additional refining.

In embodiments, the method of extracting a hydrocarbon product from a subsurface shale formation comprises increasing accessibility of hydrocarbons in subsurface shale to a fluid, wherein the subsurface shale comprises an inorganic component in addition to the hydrocarbons; contacting the hydrocarbons in the subsurface shale with a reactive fluid to create a mobile hydrocarbon-based product; contacting the mobile hydrocarbon-based product in the subsurface shale with an extraction fluid comprising C5-C16 aliphatic hydrocarbons at a temperature of greater than 197° C. and at a pressure of greater than 33.3 atmospheres to create the mobile hydrocarbon-based product; and transporting the mobile hydrocarbon-based product out of the subsurface shale formation to yield an extracted hydrocarbon-based product. In some such embodiments, the $C_5$-$C_{16}$ aliphatic hydrocarbon is pentane.

Producing the Mobile Hydrocarbon-Based Product

In some embodiments, the step of transporting the mobile hydrocarbon-based product out of the subsurface shale formation comprises the sub-steps of recovering at least a portion the mobile hydrocarbon-based product from the subsurface shale formation; and separating at least a portion of the mobile hydrocarbon-based product from the reactive fluid. Non-limiting methods for separating the pentane from the mobile hydrocarbon-based product include distillation, filtering, centrifugation, extraction, precipitation and the like. In embodiments, the separated hydrocarbon-based product comprises greater than 30 wt %, or greater than 40 wt % or even greater than 50 wt % paraffins in the $C_{10}$ to $C_{25}$ range.

In some embodiments, the method further comprises contacting the hydrocarbon in the subsurface shale with a reactive fluid to create a mobile hydrocarbon-based product; contacting the mobile hydrocarbon-based product in the subsurface shale with an extraction fluid; extracting the mobile hydrocarbon-based product into the extraction fluid; transporting at least a portion of the extraction fluid with the mobile hydrocarbon-based product from the subsurface shale formation; and separating at least a portion of the mobile hydrocarbon-based product from the extraction fluid.

In some embodiments, it is contemplated that the mobile hydrocarbon-based product comprises a slurry of hydrocarbon particulates in the extraction fluid. Accordingly, such mobile hydrocarbon-based product need not be dissolved in such a fluid.

In some embodiments, pumping is used to transport the mobile kerogen-based product out of the subsurface shale formation, wherein such pumping can be performed using techniques known to those of skill in the art. Conventional oil field practices (both flowing gas and pumping fluids, e.g., rod pumps, electrical submersible pumps, progressive cavity pumps, etc.) can be modified to provide reliability in a given producing environment. For example, modifications may require changes in metallurgy, pressure limitations, elastomeric compositions, temperature rating, and the like.

Production could use any standard producing process such as, but not limited to, Huff-n-Puff (i.e., a single well is used as both the producer and injector), water flooding, steam flooding, polymer flooding, solvent extraction flooding, thermal processes, diluent addition, steam assisted gravity drainage (SAGD), and the like.

Upgrading the Extracted Hydrocarbon-Based Product

In some embodiments, the extracted hydrocarbon-based product is upgraded to yield one or more commercial petroleum-based products. Various surface techniques common in the industry (e.g., catalytic cracking, hydroprocessing, thermal cracking, denitrification, desulfurization) may be employed to obtain a desired commercial product from the extracted hydrocarbon-based product. Such surface upgrading is largely dependent on the nature of the extracted hydrocarbon-based product relative to the commercial product that is desired.

Integrated Production Method

Figure 3:
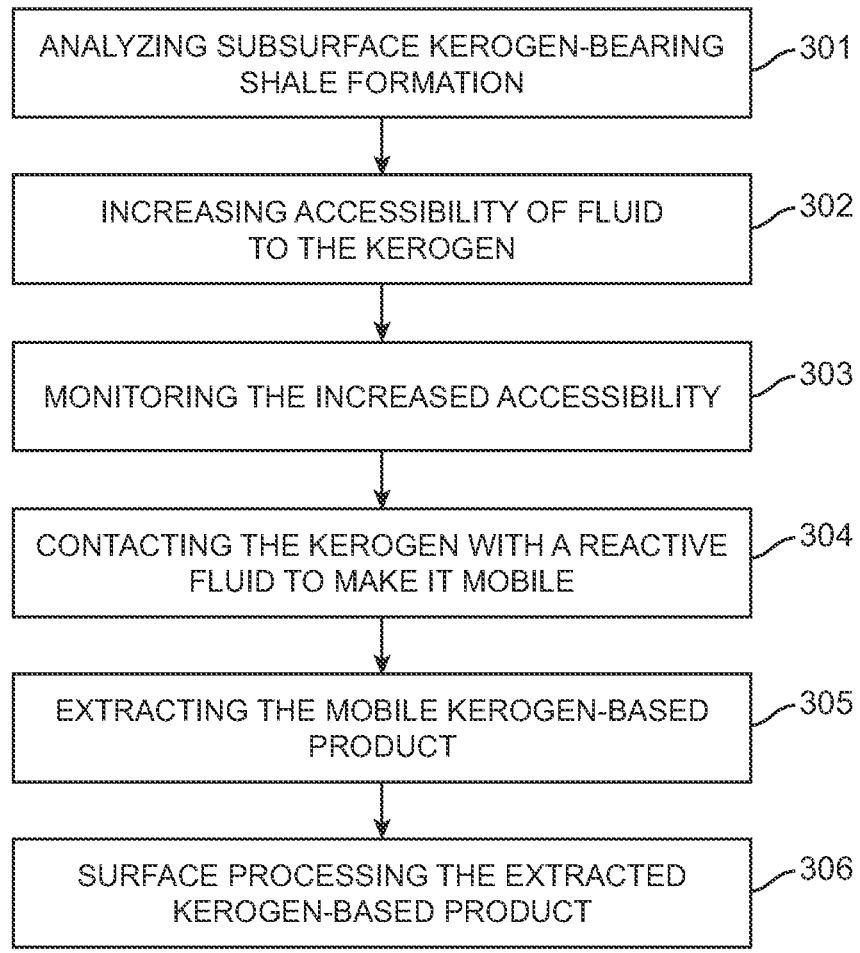
FIG. 3 depicts, in stepwise fashion, integrated processing methods of extracting a petroleum-based product from subsurface oil shale, in accordance with some embodiments of the present invention.

Referring to FIG. 3, in some embodiments, the present invention is directed to integrated production methods comprising the steps of: (Step 301) analyzing a subsurface kerogen-bearing shale formation so as to derive information regarding the hydrocarbon contained therein; (Step 302) increasing accessibility of said hydrocarbon in the subsurface shale to a fluid, wherein the subsurface shale comprises an inorganic component in addition to the hydrocarbon; (Step 303) monitoring the increased accessibility provided in Step 302; (Step 304) contacting the hydrocarbon in the subsurface shale with an extraction fluid comprising pentane to create a mobile hydrocarbon-based product, wherein said an extraction fluid is selected in view of the information derived in Step 301; (Step 305) transporting the mobile hydrocarbon-based product out of the subsurface shale formation to yield an extracted hydrocarbon-based product; and (Step 306) optionally processing the extracted hydrocarbon-based product.

Generally, such above-described integrated production methods are consistent (in terms of their common steps) with the aforementioned methods of extracting a hydrocarbon-based product from a subsurface shale formation. See above for more detail on the various steps shared by such methods.

Integrated Production System

Figure 4:
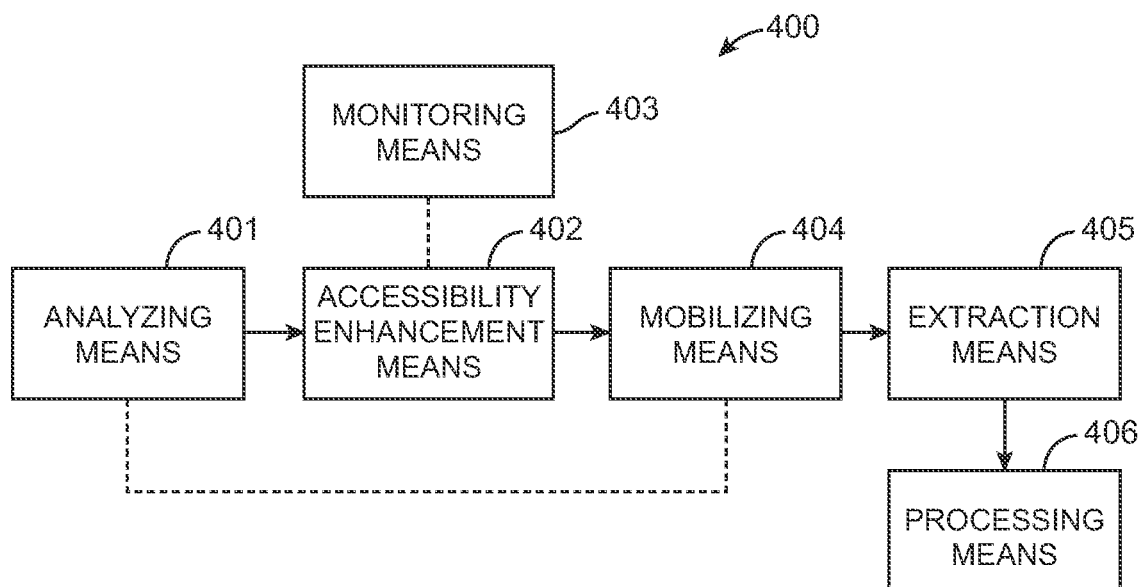
FIG. 4 is a flow diagram illustrating a system for implementing some integrated processing method embodiments of the present invention.

Referring to FIG. 4, in some embodiments, the present invention is directed to an integrated production system (400) comprising: (Means 401) a means for analyzing a subsurface kerogen bearing shale formation so as to derive information regarding the hydrocarbon contained therein; (Means 402) a means for increasing accessibility of said hydrocarbon in the subsurface shale to a fluid, wherein the subsurface shale comprises an inorganic component in addition to the 20 hydrocarbon; (Means 403) a means for monitoring the increased accessibility provided by Means 402; (Means 404) a means (mobilizing means) of contacting the hydrocarbon in the subsurface shale with an extraction fluid comprising pentane to create a mobile hydrocarbon-based product, wherein said extraction fluid is selected in view of the information derived by Means 401; (Means 405) a means (extraction means) for transporting the mobile hydrocarbon-based product 25 out of the subsurface shale formation to yield an extracted hydrocarbon-based product; and (Means 406) a means for optionally processing the extracted hydrocarbon-based product.

Like the integrated process methods, such above-described system embodiments are generally consistent with the aforementioned methods of extracting a hydrocarbon-based product from a subsurface shale formation. Notwithstanding such general consistencies, exemplary such means are provided below.

Still referring to FIG. 4, Means 401 can include subsurface analyzing technologies such as, but not limited to, well logging, core sampling and analysis (incl. kerogen chemical analysis), and the like. Means 402 can include a means or subsystem for increasing fluid accessibility to the hydrocarbon, wherein such a subsystem implements the sub-steps outlined in FIG. 2. Means 403 can include subsurface monitoring technologies such as, but not limited to, tilt-meters, microseismic techniques (involving geophones), and the like. See, e.g., Phillips. W. S., et al., "Reservoir mapping using microearthquakes: Austin Chalk, Giddings field, Tex. and 76 field. Clinton Co., KY," SPE 36651, Annual Technical Conference and Exhibition, Denver, Colo., Oct. 6-9, 1996. Means 404 typically comprises a subsystem for pumping a dense phase fluid and/or an extraction fluid into a fractured subsurface shale resource, wherein the fluid may further comprise agents operable for chemically modifying the hydrocarbon so as to render it mobile. Means 405 typically comprises a subsystem for extracting a mobile hydrocarbon-based product from the subsurface, wherein such a subsystem may comprise an extraction fluid (see above) and a pumping technology. Finally, Means 406 can involve any processing sub-system which optionally processes the extracted hydrocarbon-based product to yield a desired product or intermediate. Exemplary such Means 406 include, but are not limited to, conventional retorting, pipeline transport, conventional separation techniques, and the like.

Figure 5:
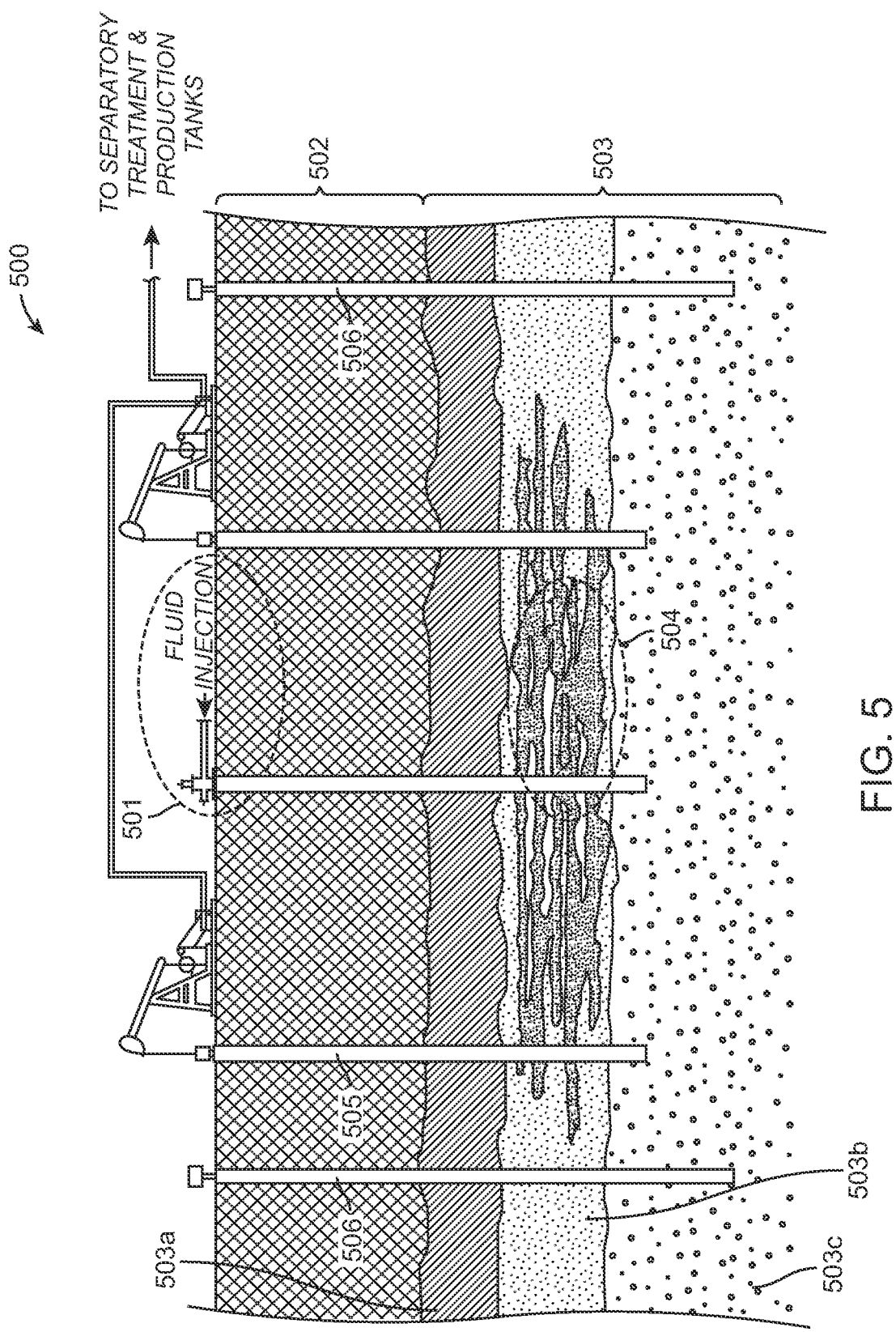
FIG. 5 is a schematic showing how a subsurface shale formation can be fractured, in accordance with some system and/or method embodiments of the present invention.

Referring to FIG. 5, integrated system 500 comprises establishing an injection well 501 that extends into the subsurface through the (e.g., Uinta) formation 502 and the (e.g., Green River) formation 503, wherein the latter is subdivided into three zones (503a, 503b, and 503c). Fluids are injected into the formation via injection well 501 and provide a fractured formation 503b having increased fluid accessibility to the kerogen contained therein. Such fluid access further provides for contacting the kerogen with a reactive fluid and extraction fluid so as to extract the mobile kerogen-based product out of the formation via one or more producing wells 505 to yield an extracted kerogen-based product. Note that water monitoring can be carried out, for example, via groundwater monitoring wells 506 to verify that no groundwater contamination has occurred as a result of fracturing into existing aquifers. One extracted, the extracted kerogen-based product can be transported via pipe to separator/treatment and production tanks.

Variations

A variation (i.e., alternate embodiment) on the above-described process is the application of some or part of such above-described methods to alternative sources, i.e., low-permeability hydrocarbon-bearing (e.g., oil and gas) formations, in situ coal, in situ heavy oil, in situ oil sands, and the like. General applicability of at least some of the above-described invention embodiments to any hydrocarbon-bearing formation exists. Surface processing applications may include upgrading of oil shale, coal, heavy oil, oil sands, and other conventional oils with asphaltenes, sulfur, nitrogen, etc.

EXAMPLES

Example 1

Green River oil shale obtained from Red Point, Colo., USA was crushed in a Shatterbox (Spex Inc., Model 8500) and then sieved into several sized fractions (400 mesh, 100 mesh and chunks ranging in size from 6 mm to 1 mm) and stored under a nitrogen atmosphere.

A 10 g sample of 400 mesh crushed oil shale was placed in a thimble which was inserted in a stainless steel autoclave, which was equipped with an electric furnace to maintain the temperature and a pressure controller to maintain the pressure within the autoclave. A 50 ml aliquot of pentane (spectrograde, Fisher scientific) was introduced to make a slurry with the oil shale. More pentane (~150 mL) was poured into the autoclave. The autoclave was closed and pressurized with nitrogen up to the required pressure. The nitrogen was then vented along with the air from the autoclave. This was repeated three times and finally the autoclave was pressurized with nitrogen up to the desired pressure. The autoclave was then heated to 210° C. at a rate of ~3° C. min$^{-1}$. The mixture was maintained at these conditions for a given time (2 h, 5 h and 10 h) after which the autoclave was vented 210° C. into a separate collection vessel which was cooled to −78° C. using an isopropanol and dry ice mixture. The collected liquid product was removed in a rotary evaporator and the extract was analyzed.

The product yield, Y, is defined as:

$Y(Wt\%)=100\times Wt$ of extract/Wt of oil shale assuming 20% total organic matter present in the raw oil shale, the total recovery fraction (TRF) is defined as:

TRF(%)=100×(Wt. of extract/Total organic matter in the raw oil shale).

Figure 6:
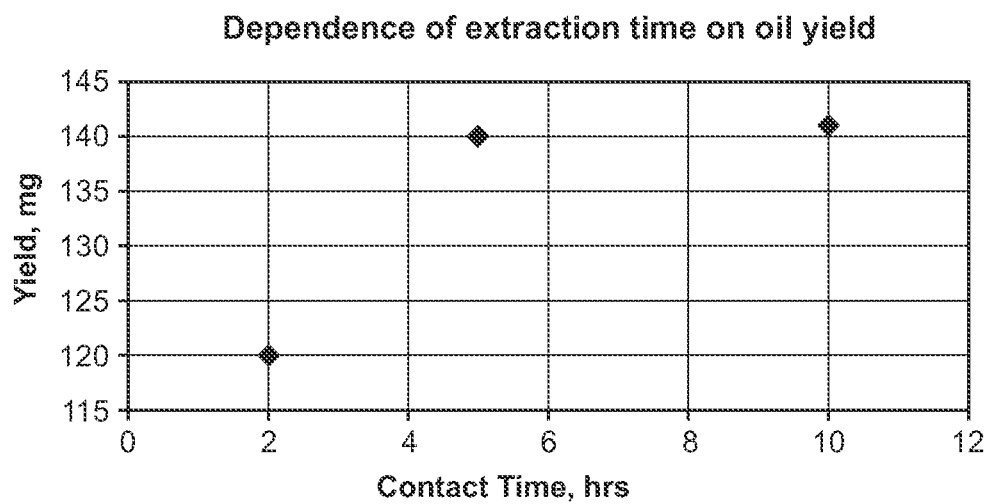
FIG. 6 illustrates the results of extracting hydrocarbons from shale using pentane.

The data tabulated in Table I and illustrated in FIG. 6 show that an extraction time of 5 hours was sufficient to approach the maximum extraction of hydrocarbons from the shale samples.

TABLE I

| Contact Time | Mesh Size | Temp. (° C.) | Pressure (psi) | Initial weight of oil shale (g) | Mass loss (g) | Yield (mg) | Total Recovery Fraction (%) |
|---|---|---|---|---|---|---|---|
| 2 hrs | 400 | 210 | 800 | 10.05 | 0.31 | 120 mg | 6 |
| 5 hrs | 400 | 210 | 800 | 10.05 | 0.35 | 140 mg | 7 |
| 10 hrs | 400 | 210 | 800 | 10.06 | 0.35 | 141 mg | 7 |

Example 2

Example 1 was repeated at a constant 5 hours extraction time and 210° C. to determine the dependence of mesh size on extraction of organic matter from oil shale using pentane. As shown in Table II, extraction was fairly constant in the 400-100 mesh particle size range, and increased significantly when the particle size was increased to 1-6 mm chunks.

TABLE II

| Mesh Size | Time (hrs) | Temp. (° C.) | Pressure (psi) | Initial weight of oil shale (g) | Mass loss (g) | Yield (mg) | Total Recovery Fraction (%) |
|---|---|---|---|---|---|---|---|
| 400 | 5 | 210 | 800 | 10.05 | 0.35 | 140 mg | 7.0 |
| 100 | 5 | 210 | 800 | 10.19 | 0.27 | 134 mg | 7.0 |
| 1-6 mm chunks | 5 | 210 | 800 | 9.75 | 0.25 | 150 mg | 7.7 |

Example 3

Example 1 was repeated on 400 mesh oil shale particles, at 5 hours and 210° C. and at pressures between 500 psi and 1600 psi. Results are tabulated in Table III. The results show that extraction efficiency effectively remained constant over this pressure range.

TABLE III

| Pressure (psi) | Mesh Size | Time (hrs) | Temp. (° C.) | Initial weight of oil shale (g) | Mass loss (g) | Yield (mg) | Total Recovery Fraction (%) |
|---|---|---|---|---|---|---|---|
| 500 | 400 | 5 | 210 | 10.05 | 0.29 | 110 mg | 5.8 |
| 800 | 400 | 5 | 210 | 10.05 | 0.35 | 140 mg | 7.0 |
| 1600 | 400 | 5 | 210 | 10.05 | 0.31 | 131 mg | 6.5 |

Example 4

Example 1 was repeated to determine the effect of temperature on extraction efficiency of pentane. As shown in Table IV, there was a significant temperature dependence. At 100° C., no extraction was detected. Increasing the temperature to 210° C. (i.e. above the critical temperature of pentane) significantly increased the extraction efficiency of pentane. Increasing the temperature to 300° C. had the additional effect of increasing the production of light products, as evidenced by the increase in pressure from 800 psi to 2400 psi. At 300° F., product yield increased, but there was a decrease in aliphatic (waxy) fractions in the product, and an increase in the amount of polar compounds.

TABLE IV

| Temperature (° C.) | Pressure (psi) | Mesh Size | Time (hrs) | Initial weight of oil shale (g) | Mass loss (g) | Yield | Total Recovery Fraction (%) |
|---|---|---|---|---|---|---|---|
| 100 | 800 | 400 | 5 | 10.00 | 0.18 | 0 mg | — |
| 210 | 800 | 400 | 5 | 10.05 | 0.35 | 140 mg | 7.0 |
| 300 | 2400 | 400 | 5 | 10.07 | 0.54 | 240 mg | 12.0 |

Example 5

Figure 7:
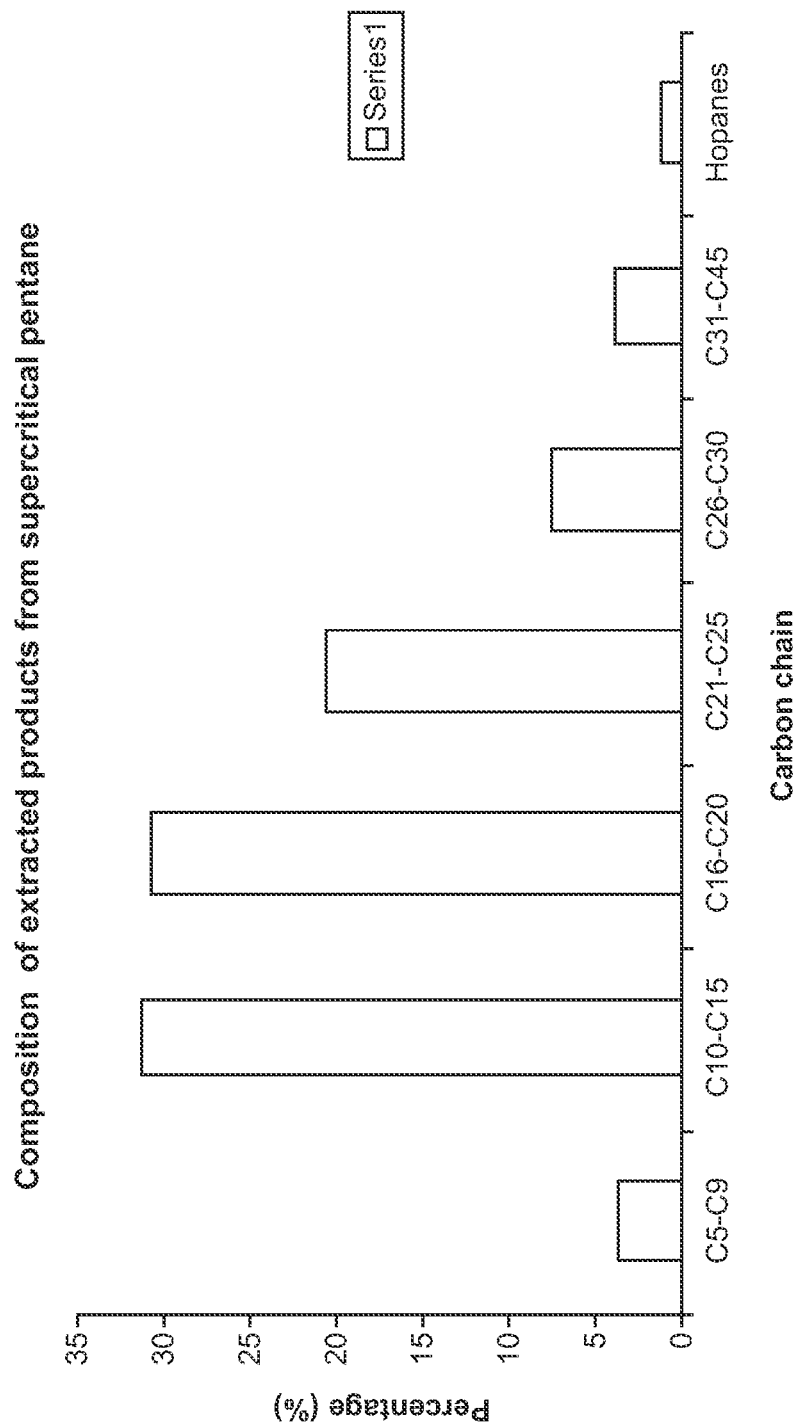
FIG. 7 illustrates the product distribution of the extract obtained using pentane at 210° C. and 800 psi.

Example 1 was repeated on 400 mesh size crushed oil shale at 210° C. and 800 psi pressure. The extract from an oil shale sample was analyzed by Gas chromatography coupled with Mass spectrometry (GC-MS) on a Hewlett Packard instrument (5897 series) equipped with a single quadruple detector. The column used was HP-DB5, 30 m×0.25 mm I.D.×0.25 μm film, glass capillary and the temperature program was 60° C. for 2 min, increased at 10° C./min to 170° C. and then 15° C./min to 310° C., where it was held for 45 min. Volumes of 4 μL of pentane solution were injected using the split mode. The carrier gas was helium with a flow rate of 1.5 mL/min. FIG. 7 illustrates the product distribution of the extract obtained using pentane at 210° C. and 800 psi. A gas chromatograph coupled with mass spectrometry (GC MS) spectrum of the extract (not shown) was identified as yielding mostly paraffins (ranging from n-$C_{10}$ to n-$C_{45}$) along with some polar components (n-alkanoic acids and its methyl esters). The results in FIG. 7 show that the highest proportion of product extracted from the oil shale were paraffins in the $C_{10}$ to $C_{25}$ range.

What is claimed:
1. A method for extracting a hydrocarbon-based kerogen product from a subsurface shale formation: comprising
   a. increasing accessibility of hydrocarbons in subsurface shale to a fluid, wherein the subsurface shale comprises an inorganic component in addition to the hydrocarbons;
   b. contacting the hydrocarbons in the subsurface shale with an extraction fluid, wherein the extraction fluid comprises pentane at a temperature of greater than 197° C. and at a pressure of greater than 33.3 atmospheres and a second component selected from the group consisting of carbon dioxide ($CO_2$), nitrogen ($N_2$), ammonia ($NH_3$), carbon monoxide (CO), argon (Ar), hydrogen ($H_2$), hydrogen sulfide ($H_2S$), air and combinations thereof to create a mobile hydrocarbon-based product; and
   c. transporting the mobile hydrocarbon-based product out of the subsurface shale formation to yield an extracted hydrocarbon-based product.
2. The method of claim 1, wherein at least a portion of the pentane is present in the formation as a supercritical fluid.
3. The method of claim 1, wherein the extraction fluid comprises pentane and the second component up to a weight ratio of pentane to the second component of 10:90.
4. The method of claim 1, wherein the extraction fluid contacts the hydrocarbons in the subsurface shale for a period of time of from 3 hours to 30 days.
5. The method of claim 1, wherein pumping is used to transport the mobile hydrocarbon-based product out of the subsurface shale formation.
6. The method of claim 1, wherein the hydrocarbon-based product comprises greater than 50 wt % paraffins in the $C_{10}$ to $C_{25}$ range.
7. The method of claim 1, wherein at least a portion of the second component is carbon dioxide at a pressure above critical pressure of carbon dioxide and at a temperature above critical temperature of carbon dioxide.
8. The method of claim 1, wherein the step of increasing accessibility comprises the substeps of:
   a. providing for a cased injection well into the subsurface shale formation comprising the subsurface shale;
   b. pressurizing the injection well with a dense phase fluid to provide a pressurized well; and
   c. passing the dense phase fluid into the formation, and forming fractures within the formation.
9. The method of claim 8, wherein the dense phase fluid is selected from the group consisting of: carbon dioxide ($CO_2$), nitrogen ($N_2$), liquid natural gas (LNG), ammonia ($NH_3$), carbon monoxide (CO), argon (Ar), liquefied petroleum gas (LPG), hydrogen ($H_2$), hydrogen sulfide ($H_2S$), air, and $C_1$ to $C_{20}$ hydrocarbons.
10. The method of claim 1, wherein the step of transporting the extracted hydrocarbon-based product out of the subsurface shale formation comprises utilizing the extraction fluid.
11. The method of claim 10, wherein the extracted hydrocarbon-based product is upgraded to yield one or more commercial petroleum-based products.
12. The method of claim 11, wherein the extracted hydrocarbon-based product is upgraded by employing at least one of catalytic cracking, hydroprocessing, thermal cracking, denitrification and desulfurization.
13. The method of claim 1, wherein the step of increasing accessibility comprises the substeps of:
   a. providing for a cased injection well into the subsurface shale formation comprising the subsurface shale;
   b. delivering a slurry to the injection well, the slurry comprising liquid $CO_2$ and solid $CO_2$;
   c. pressurizing the well by permitting the liquid $CO_2$ and solid $CO_2$ inside the well to form supercritical $CO_2$, thereby forming a pressurized well; and
   d. depressurizing the pressurized well to reach a steady state reduced pressure, whereby an associated adiabatic expansion of the $CO_2$ cools the subsurface shale formation and causes thermal and mechanical stresses within the formation which in turn lead to fracturing of said formation.
14. The method of claim 13, wherein the sub-steps of pressurizing and de-pressurizing are repeated until an equilibrium pressure is reached.
15. The method of claim 13, wherein explosives are added to the slurry of liquid and solid $CO_2$ to enhance rubblization and fracturing of the formation.
16. The method of claim 13, further comprising, after the step of pressurizing and before the step of depressurizing, an interim step of contacting the shale with a heated fluid to enhance the thermal stresses created in the subsurface shale formation.
17. The method of claim 1, further comprising contacting the hydrocarbons in the subsurface shale with a reactive fluid to create a mobile hydrocarbon-based product.
18. The method of claim 17, wherein the step of contacting the hydrocarbons in the subsurface shale with a reactive fluid involves a chemical modification of the hydrocarbons.
19. The method of claim 18, wherein the chemical modification involves at least some cracking of the hydrocarbons.
20. The method of claim 17, wherein the reactive fluid comprises a component selected from the group consisting of organic acids, inorganic acids, peroxides, free radical producing chemicals, Lewis acids, humic depolymerization agents, olefin metathesis catalysts, microbes, catalysts, and combinations thereof.

* * * * *